United States Patent

Vehmas et al.

[11] Patent Number: 5,078,774
[45] Date of Patent: Jan. 7, 1992

[54] METHOD AND APPARATUS FOR HEAT-STRENGTHENING GLASS SHEETS

[75] Inventors: Jukka H. Vehmas; Harri E. Perämaa, both of Tampere, Finland

[73] Assignee: Tamglass Oy, Tampere, Finland

[21] Appl. No.: 662,117

[22] Filed: Feb. 28, 1991

[30] Foreign Application Priority Data

Jan. 11, 1991 [FI] Finland ................... 910160

[51] Int. Cl.⁵ ............................................. C03B 27/04
[52] U.S. Cl. .......................................... 65/118; 65/114; 65/349; 65/352; 65/168
[58] Field of Search ............... 65/118, 114, 119, 168, 65/348, 349, 350, 351

[56] References Cited

U.S. PATENT DOCUMENTS

| | | | |
|---|---|---|---|
| 1,919,167 | 7/1933 | Lufkin | 65/348 |
| 2,864,203 | 12/1958 | Long | 65/348 |
| 3,365,285 | 1/1968 | Richardson | 65/118 |
| 3,452,408 | 7/1969 | Bossetti | 65/118 X |
| 4,308,046 | 12/1981 | Toussaint et al. | 65/168 |
| 4,759,788 | 7/1988 | Ward | 65/114 |
| 4,767,439 | 8/1988 | Reunamäki | 65/118 X |

Primary Examiner—Robert L. Lindsay
Attorney, Agent, or Firm—Burns, Doane, Swecker & Mathis

[57] ABSTRACT

The invention relates to an apparatus for heat-strengthening glass sheets. In a heat-strengthening station (3) down-stream of a heating furnace the cooling rate of a glass sheet is retarded by means of plates (9, 11), which are set above and below a glass sheet and return some of the thermal radiation back to a glass sheet and slow down convection. Thus, a glass sheet can be heat-strengthened by chilling it at a certain controlled cooling rate. In order to make also the lower plate effectively return some of the termal radiation applied thereto despite the rolls fitted in between, the top surface of lower plate (11) is made highly reflective to thermal radiation and further corrugated in a manner that the ribs of corrugations extend between the rolls close to a glass sheet.

11 Claims, 4 Drawing Sheets

METHOD AND APPARATUS FOR HEAT-STRENGTHENING GLASS SHEETS

The present invention relates to an apparatus for heat-strengthening glass sheets, said apparatus comprising a furnace provided with heating elements for heating the glass sheets close to a softening temperature, and a heat-strengthening station provided with horizontal conveyor rolls having a top surface which defines a conveying level for the glass sheets.

Heat-strengthening of glass differs from tempering in the sense that cooling is effected at a substantially slower rate, whereby the surface tensions of glass also remain substantially lower. The qualities of heat-strengthened glass have been described e.g. in the published GB application 2 191 998. In order to produce standardized heat-strengthened glass, the strict control of a cooling rate is absolutely necessary. In this context, a particular problem is that, as the glass thickness changes, the cooling rate also changes substantially (if cooling conditions remain constant).

The Applicant's earlier Finnish Patent application No. 903362 discloses a solution for effecting the cooling of glass sheets of varying thickness and also that of rather thick (more than 10 mm) glass sheets at a controlled and sufficiently slow rate. This is effected by cooling a glass sheet between upper and lower plates. The cooling rate can be controlled by adjusting the distance of the plates from a glass sheet and also by applying more or less chilling blast to the outer surfaces of the plates. The practical tests of this apparatus have confirmed that, if the inner or glass-facing surfaces of both plates are identical in terms of reflecting thermal radiation, the result is a non-uniform compression stress and curved glass. The reason for this is that the rolls provide a screen to the reflection of thermal radiation from the lower plate back to glass. In addition, a convection of heat occurs into the rolls.

According to the present invention, it has been discovered that, if the bottom surface of the upper plate is made black (emission coefficient $\epsilon \approx 0.8 \ldots 0.9$) and the top surface of the lower plate is made bright, the result is quite a uniform level of compression stress and flat glass.

With thick glasses (e.g. 15 mm and 19 mm), however, the attainment of or reaching below some desired level of compression stress requires that the lower side heat transmission be further reduced from whatever is achieved by means of a bright plate positioned below the rolls. In order to accomplish this, a basic idea of the invention is that the bright lower plate must also be designed in a manner that it can be brought as close to the glass as possible. This is to provide the bright lower plate with an improved visibility factor relative to the glass and also to increase temperature of the air below the glass for a reduced convection into air.

Thus, the invention is characterized in that the surface of a lower plate is made highly reflective to heat radiation and corrugated in a manner that in a top plate position the apexes or ribs of such corrugations extend in between the rolls to a level substantially above the lowermost points of the rolls.

A solution of the invention has typically been capable of reducing the heat transfer on the lower side circa 25 ... 30%. This is compensated for by reducing the emissivity of the bottom side of an upper plate in the same respect.

According to a preferred embodiment of the invention, the upper plate is flat and has a a grey ($\epsilon \approx 0.5 \ldots 0.7$), so it is substantially poorer in reflecting thermal radiation than the top surface of a lower plate, the latter being polished highly reflective to thermal radiation at least over the areas between the rolls.

The invention also offers excellent possibilities of controlling the cooling conditions. An adjustment of the distance between a lower plate designed according to the invention and a glass sheet provides for a considerably more effective control action (more extensive control range) than that achieved by a flat lower plate. On the other hand, a cooling blast directed to a bright-surfaced lower plate does not have a major effect since a highly reflective lower plate absorbs poorly the thermal radiation arriving thereat. Instead, a cooling blast applied to the upper plate bears an essential effect on the cooling rate. Thus, as for the upper plate, the control action can be carried out either by adjusting the distance or by regulating the cooling blast or by a combination thereof. Adjustment of the distance of an upper plate primarily has an effect on the degree of convection. There is hardly any effect on thermal radiation.

Thus, it is possible to use an apparatus of the invention for heat-strengthening glasses of very different thicknesses (e.g. 8 mm–19 mm) according to various standards.

With an apparatus of the invention it is also possible to find such heat-strengthening conditions so as to minimize the fracturing of glasses at the heat-strengthening station. However, due to adjustment errors or other reasons the fracturing of glasses cannot be completely avoided. If glass fractures occur, the fragments of glass remaining upright between the corrugated lower plate and the rolls could cause damage to the rolls and the following glasses. Therefore, the invention relates also to a method for use in connection with the apparatus for removing the fractured glass sheets from the lower plate. The method is characterized in that the length of glass sheets is measured prior to and after the heat-strengthening and, if a length difference is detected, the conveyor rolls are stopped and the lower plate or its separate bottom plate is pivoted into an inclined position in a manner that one side edge of the lower plate or its separate bottom plate will be at a substantially lower level than the other side edge.

According to a preferred embodiment of the invention, the heat-strengthening station can be readily modified to serve as a tempering station. For this purpose, the upper plates and the lower plates comprise glass strips, which are successive in the longitudinal direction of the heat-strengthening station or in the glass sheet advancing direction and which are removably installed upon ascendable and descendable supporting frames. The glass strips can be readily detached from their frames and removed from the apparatus.

A corrugated lower plate of the invention can be designed in a plurality of ways. The ribs and valleys of corrugations can be made of a common material or, alternatively, the corrugations have separate ribs or apexes mounted on top of a separate bottom plate.

One embodiment of the invention will now be described in more detail with reference made to the accompanying drawings, in which FIG. 1 shows an apparatus of the invention in a schematic vertical section.

Figure 1:
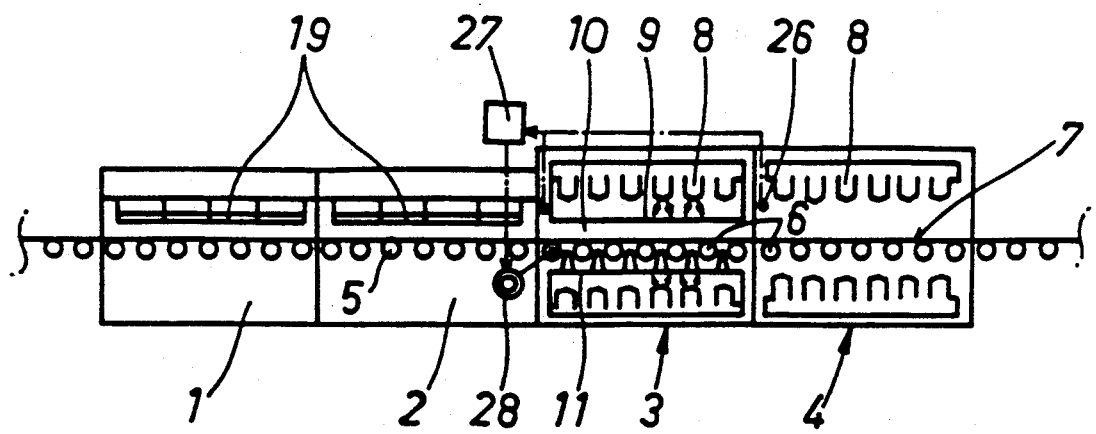

The apparatus shown in FIG. 1 includes a first furnace section 1, a second furnace section 2, a heat-strengthening section 3, and a cooling section 4. The conveyor running in furnace 1, 2 comprises horizontal rolls 5 and the conveyor running in stations or sections 3, 4 comprises horizontal rolls 6. Rolls 5 and 6 are operated to carry glass sheets from one section into another, and in addition, by rotating the rolls in a reciprocating fashion, the glass sheets are set in an oscillating motion within each section. The heating elements 19 fitted in furnace sections 1 and 2 can be e.g. resistance elements, but naturally, it is also feasible to use other types of heat sources, such as gas burners.

Sections 3 and 4 are provided with cooling air nozzles 8 on either side of a top level 7 (glass sheet advancing level) of the conveyor made up by rolls 6. Nozzles 8 are connected to transversely elongated nozzle housings 18 (see FIG. 6), wherein the cooling air is delivered by means of fans or compressors, not shown. Nozzles 8 can be of a similar construction to those which are typically used in the quenching units of tempering plants. These have been generally known and used in various designs for several decades and, thus, the construction thereof will not be described in this context.

The cooling rate retardation plates 9 and 11 are disposed between blast nozzles 8 and a glass sheet 15 carried on advancing level 7. Plates 9 and 11 define therebetween a heat-strengthening chamber 10.

Figure 2:
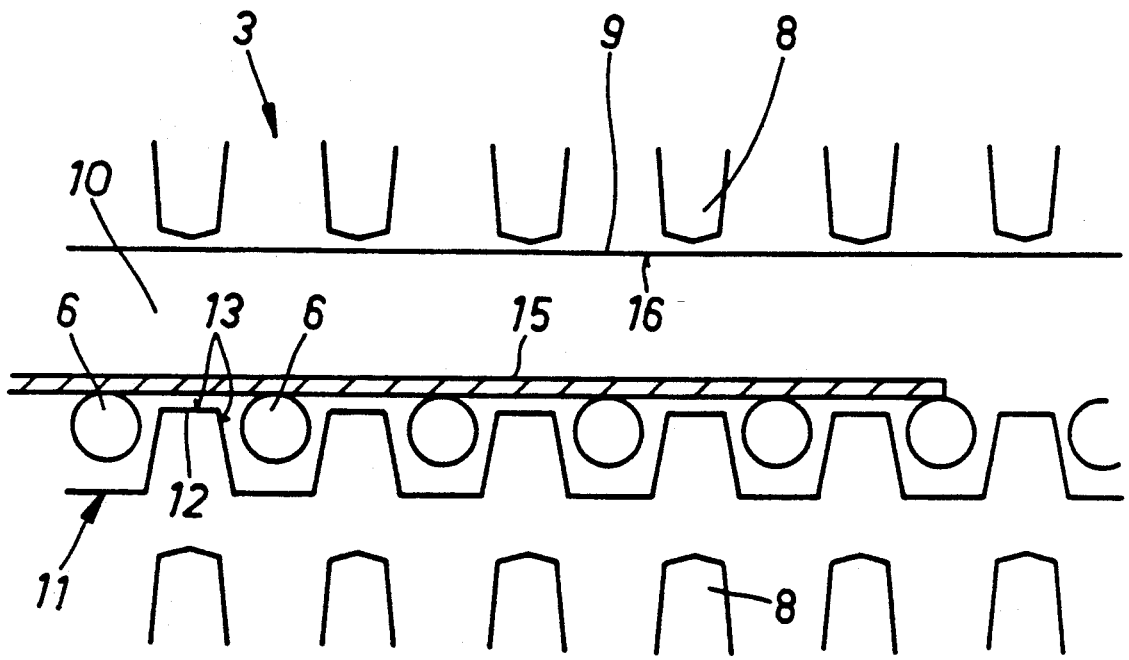
FIG. 2 is a more detailed view of the essential section of a heat-strengthening station in a schematic vertical section.

Since said rolls 6 substantially reduce the visibility factor of lower plate 11 in relation to glass sheet 15, the cooling-rate retarding action of upper and lower plate 9 and 11 will be substantially dissimilar. However, this dissimilarity has been compensated for in the invention by making the top surface 13 of lower plate 11 bright, i.e. highly reflective to thermal radiation, and in addition, said lower plate 11 is corrugated in a manner that ribs or apexes 12 of the corrugations extend in between rolls 6 to lie substantially above the lowermost points of said rolls 6. In the example shown in FIG. 2, said corrugation ribs 12 reach above a plane extending through the center axes of rolls 6. The height of corrugations 12 is of the same order as or slightly exceeds the diameter of rolls 6. This type of corrugated design improves substantially the visibility factor of plate 11 in relation to glass 15. By virtue of the bright surface 13 and good visibility factor of plate 11 a substantially larger portion of thermal radiation can be brought back to glass sheet 15 than before. In addition, plate 11 can be set near glass sheet 15 to increase temperature in the intermediate space and to reduce cooling of the bottom surface of glass sheet 15 as a result of convection. It can be noted that the anti-cooling action of lower plate 11 can also be provided with a wide control range simply by adjusting the distance between lower plate 11 and glass sheet 15.

The upper plate 9 is provided with a bottom surface 16 which can be an oxidized steel surface or it can also be painted grey. The reflection coefficient of surface 16 is less than 0.7. Thus, the anti-cooling action of upper plate 16 can be controlled not only by adjusting the distance between itself and a glass sheet but also by directing a cooling blast from nozzles 8 to the top surface of upper plate 9.

Both plates 9 and 11 can be made of steel sheets, e.g. AISI 304 2BA. The top surface of lower plate 11 can be polished e.g. by anneal polishing. The reflective surface can also be made on top of the steel, e.g. by using hard chromium plating. The reflection coefficient of surface 13 is more than 0.8.

Figure 3:
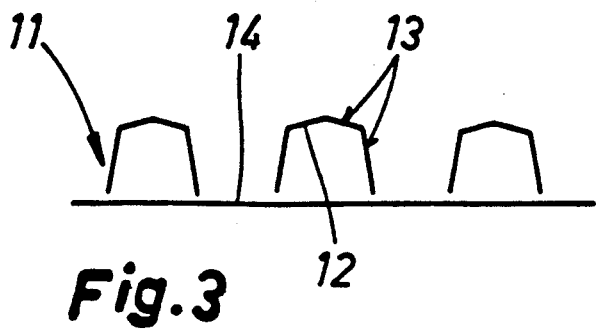
FIG. 3 shows an alternative embodiment for a lower plate used in a heat-strengthening station.

FIG. 3 illustrates an alternative design for a plate 11, wherein a common bottom plate 14 is covered with separate corrugation ribs 12.

Figure 4:
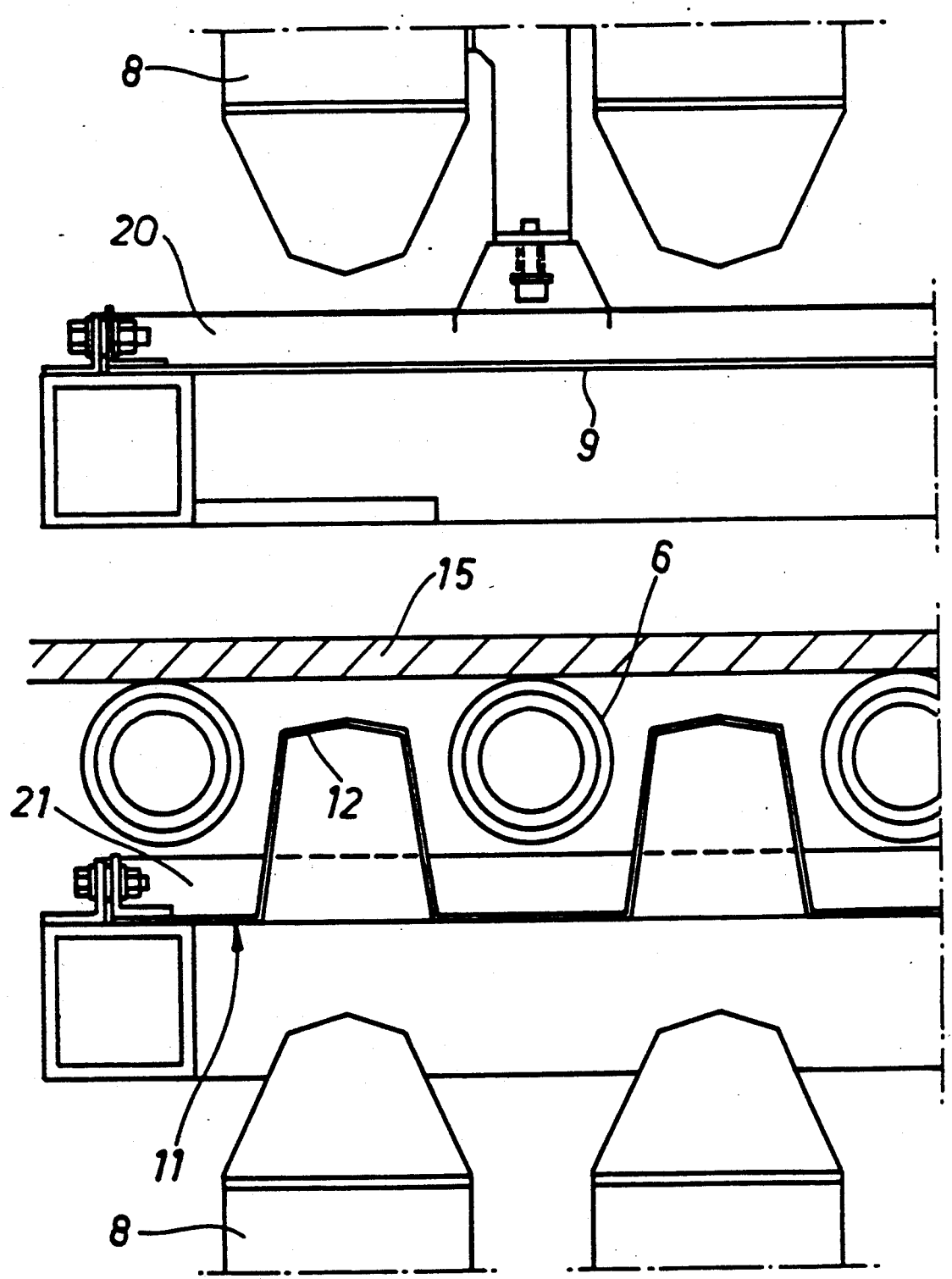
FIG. 4 shows a lengthwise vertical section of the end of a heat-strengthening station of the invention with the apparatus components in a heat-strengthening position.
Figure 5:
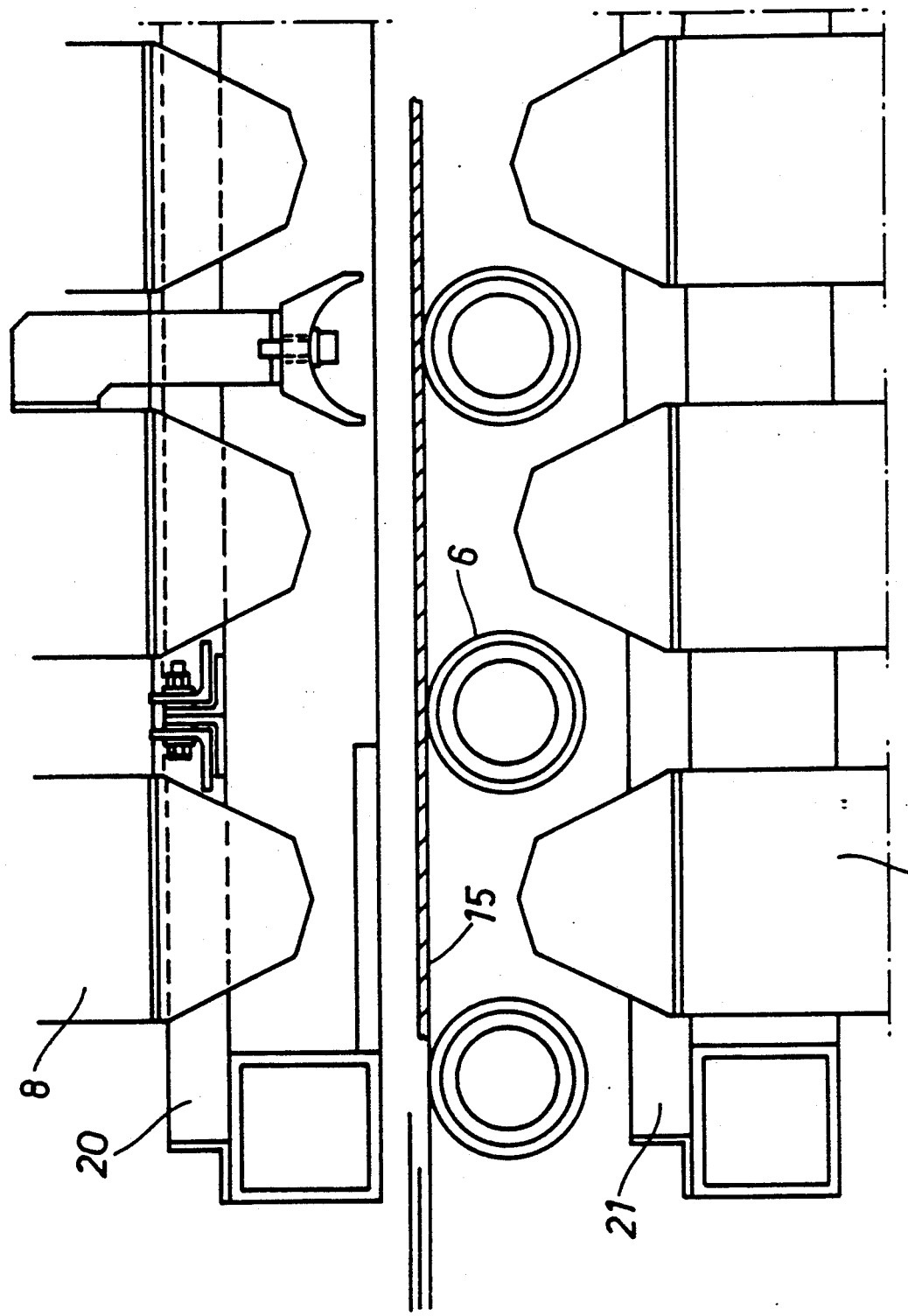
FIG. 5 shows the same as FIG. 4 but this time the apparatus components are in a tempering position.

Plates 9 and 11 are preferably made of plate strips, which are arranged one after the other in the longitudinal direction of section 3 and which are removably mounted upon liftable and descendable frames 20 and 21, shown in FIGS. 4 and 5. In FIG. 4, said plates 9 and 11 are set in a heat-strengthening position. When plates 9 and 11 are detached from their respective frames 20 and 21 and are pulled out through the side of the apparatus, the ends of nozzles 8 can be brought inside said frames 20 and 21 and sufficiently close to a glass sheet 15 to effect tempering of said glass sheet. Thus, the same apparatus can also be used for tempering thin glass sheets. On the other hand, glass sheets of considerable thickness, which have a slower cooling rate, can be carried through heat-strengthening section 3 into a chilling section 4 for a quenching treatment therein. Thus, the apparatus can be alternately used as a heat-strengthening apparatus and a tempering apparatus for rather thick glasses without removing plates 9 and 11.

Figure 6:
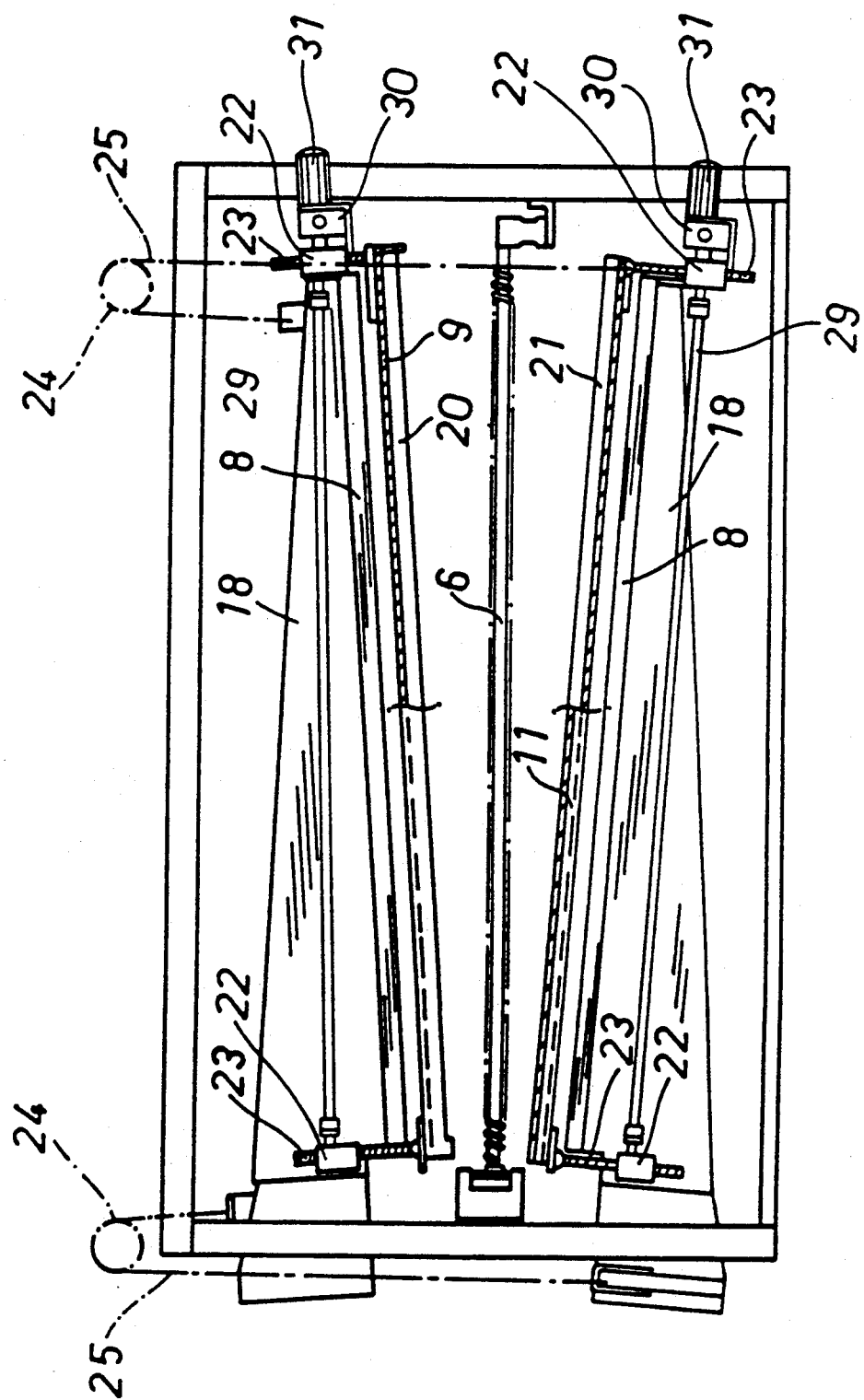
FIG. 6 shows a schematic cross-section of a heat-strengthening station of the invention in an opened position for the removal of glass fragments and debris.

FIG. 6 shows an example of the equipment for adjusting the distance between plates 9 and 11 as well as nozzles 8 both relative to a glass sheet and to each other. The nozzle housings 18 of nozzles 8 are fitted with screw jacks 22, said frames 20 and 21 being secured to the ends of such lifting screws 23. By moving screws 23 it is possible to adjust the distance of plates 9 and 11 from a glass sheet and, at the same time, also from nozzles 8. The rotation of lifting screws 23 is effected by means of cardan transmissions 29 and mitte gears 30 which are powered by an electric motor 31 mounted alongside the apparatus. The nozzle boxes 18 are suspended on the apparatus frame by means of chains 25 extending over sprockets 24. Said nozzle housings 18 can be carried towards and away from each other by rotating said sprockets 24. This can be effected separately for each end of nozzle housings 18, so the apparatus can also be opened on the side as shown in FIG. 6 for removing the glass fragments and debris accumulated on top of lower plate 11. An alternative approach is to employ a plate assembly as shown in FIG. 3, whereby a separate bottom plate can be designed to be pivotable to an inclined position in a manner that one side edge thereof will be at a substantially lower level than the other side edge. Thus, the corrugation ribs 12 can still remain supported by frame 21 (FIGS. 4 and 5).

The removal of fractured pieces of glass as early as possible is important since the corrugated configuration of plate 11 might cause the glass fragments remaining upright between corrugation ribs 12 and rolls 6 to inflict damage to rolls 6 and the trailing glass sheets may run into such fragments and cause more breakage of glass.

A procedure to avoid this type if damage is such that the length of glass sheets is measured prior to and after the heat-strengthening and, if the measurements indicate a length difference, the rolls 6 are stopped and glass fragments and debris are removed as described above. Since the travelling speed of glass sheets on rolls 6 is known, the length thereof can simply be measured by means of electric eyes 26 located at the upstream and downstream ends of section 3 (FIG. 1). Electric eyes 26 can be located on the centre line of the track or two parallel (thus, four in total) electric eyes 26 can be positioned on either side of the centre line of the track. If the electric eye 26 positioned downstream of section 3 produces pulses for the leading and trailing edge of a glass sheet with a shorter time interval than the electric eye located at the upstream end of section 3, a microprocessor 27 operates to open a switch 28 for stopping said rolls 6 in section 3. The cleaning of lower plate 11 can be carried out manually or it can also be automated so that the operator only needs to visually check the result of cleaning.

It is obvious that the invention is not limited to the above embodiment but a plurality of modifications can be made to the structural details and the assembly in which the invention is applied.

We claim:

1. An apparatus for heat-strengthening glass sheets, said apparatus comprising a furnace (1, 2) provided with heating elements (19) for heating the glass sheets almost to a softening temperature, and a heat-strengthening station (3) provided with horizontal conveyor rolls (6) whose top surface defines a glass sheet advancing level (7), characterized in that said heat-strengthening station (3) includes plates (9, 11) above and below said advancing level (7) for retarding the cooling rate of glass sheets, and that the surface of lower plate (11) is made highly reflective to thermal radiation and corrugated in a manner that in the elevated position of lower plate (11) the ribs or apexes (12) of said corrugations extend in between rolls (6) to a level substantially above the lowermost points of said rolls.

2. An apparatus as set forth in claim 1, characterized in that in the elevated position of lower plate (11) the corrugation ribs (12) extend to a level above the plane extending through the centre axes of rolls (6).

3. An apparatus as set forth in claim 2, characterized in that the height of the corrugations of lower plate (11) is of the same order as or slightly exceeds the diameter of rolls (6).

4. An apparatus as set forth in claim 1, characterized in that said upper plate (9) is flat and has a grey bottom surface and, thus, it is substantially poorer in reflecting thermal radiation than the top surface of lower plate (11) which, at least over the sections between said rolls (6), is polished highly reflective to thermal radiation.

5. An apparatus as set forth in claim 4, characterized in that the bottom surface of the, upper plate has a reflection coefficient less than 0.7 and the top surface of the lower plate has a reflection coefficient more than 0.8.

6. An apparatus as set forth in claim 1, characterized in that said upper plates (9) and lower plates (11) comprise plate strips, which are successively arranged in the longitudinal direction of heat-strengthening station (3) or in the advancing direction of glass sheets and which are removably mounted upon liftable and descendable supporting frames (20, 21).

7. An apparatus as set forth in claim 6, comprising blasting means (8) above and below said advancing level (7) for quenching action, characterized in that said supporting frames (20, 21) are suspended through the intermediary of mechanically operated (29–31) lifting and lowering devices (22, 23) to the housings (18) of said blasting means (8) which, in turn, are suspended upon lifting and lowering elements (24, 25), whereby the vertical position of blasting means (8) and at the same time that of both side edges of upper and lower plates (9, 11) is independently adjustable.

8. An apparatus as set forth in claim 1, characterized in that the corrugation ribs (12) of lower plate (11) are positioned on top of a separate bottom plate (14).

9. An apparatus as set forth in claim 1, characterized in that, whenever said upper and lower plates (9, 11) are removed, said supporting frames (20, 21) thereof are movable in vertical direction relative to nozzle heads (8) in a manner that the nozzle heads are brought inside supporting frames (20, 21), whereby said nozzle heads (8) can be moved to the immediate vicinity of glass sheet carrying level (7).

10. A method for removing fractured pieces of glass sheets from a lower plate of an apparatus for heat strengthening glass sheets, said apparatus having a furnace provided with heating elements for heating the glass sheets and a heat strengthening section provided with horizontal conveyor rolls whose top surface defines a glass sheet advancing level, the method including the steps of retarding the cooling rates of glass sheets by providing upper and lower plates above and below said advancing level with the surface of the lower plate being highly reflective to thermal radiation and corrugated such that, in an elevated position of the lower plate, ribs of the corrugation extend in between rolls to a level above the lowermost points of said rolls, measuring the length of glass sheets prior to and after the heat strengthening and, if a length difference is detected, stopping said conveyor rolls and pivoting the lower plate to an inclined position such that one side edge of the lower plate is brought to a level substantially lower than the other side edge.

11. An apparatus as set forth in claim 1, further comprising means for measuring the length of glass sheets prior to and after the heat strengthening and, if a length difference is detected, said conveyor rolls are stopped and the lower plate is pivoted to an inclined position such that one side edge of the lower plate is brought to a level substantially lower than the other side edge.

* * * * *